(12) United States Patent
Montero et al.

(10) Patent No.: US 12,541,461 B2
(45) Date of Patent: *Feb. 3, 2026

(54) FILTERING REMOTE DATA SYNCHRONIZATION BARRIER (DSB) INSTRUCTION EXECUTION IN PROCESSOR-BASED DEVICES

(71) Applicant: QUALCOMM Incorporated, San Diego, CA (US)

(72) Inventors: Adrian Montero, Austin, TX (US); Paul Kitchin, Austin, TX (US); Huzefa Sanjeliwala, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,171

(22) Filed: Apr. 1, 2024

(65) Prior Publication Data

US 2024/0320160 A1    Sep. 26, 2024

Related U.S. Application Data

(63) Continuation of application No. 18/188,200, filed on Mar. 22, 2023, now Pat. No. 12,135,652.

(51) Int. Cl.
G06F 12/0891 (2016.01)
G06F 12/1027 (2016.01)

(52) U.S. Cl.
CPC ...... *G06F 12/0891* (2013.01); *G06F 12/1027* (2013.01)

(58) Field of Classification Search
CPC ............. G06F 12/0891; G06F 12/1027; G06F 2212/683
See application file for complete search history.

(56) References Cited

U.S. PATENT DOCUMENTS

| 11,263,043 B1 | 3/2022 | Mukherjee |
| 2013/0031333 A1 | 1/2013 | Sankaran et al. |

(Continued)

FOREIGN PATENT DOCUMENTS

WO    2023034662 A1    3/2023

OTHER PUBLICATIONS

U.S. Appl. No. 18/188,200, filed Mar. 22, 2023.

(Continued)

*Primary Examiner* — Francisco A Grullon
(74) *Attorney, Agent, or Firm* — W&T

(57) ABSTRACT

Filtering remote data synchronization barrier (DSB) instruction execution in processor-based devices is disclosed herein. In some exemplary aspects, a processor-based device provides a plurality of processors including an issuing processor and a remote processor. The remote processor receives, from the issuing processor, a translation lookaside buffer (TLB) invalidation (TLBI) instruction indicating a request to invalidate a TLB entry of a plurality of TLB entries of a TLB of the remote processor. The remote processor also receives a DSB instruction from the issuing processor. The remote processor determines whether the TLBI instruction satisfies filtering criteria, which specify conditions under which execution of the DSB instruction by the remote processor is unnecessary. If the remote processor determines that the TLBI instruction satisfies the filtering criteria, the remote processor foregoes execution of a DSB operation corresponding to the DSB instruction, and issues an early DSB acknowledgement to the issuing processor.

20 Claims, 8 Drawing Sheets

EXEMPLARY INSTRUCTION SEQUENCE 100

```
102— STR Xd, [Xn]                  ; Updates to the page table entry (PTE)
104— DSB <sy>                      ; Ensure global observation of PTE update
106— TLBI VAE1<nsh|is|os> Xt       ; Invalidate TLB entries for updated PTE
108— DSB <sy>                      ; Ensures completion of TLBI
110— ISB                           ; Synchronizes context on this processor
```

(56) References Cited

U.S. PATENT DOCUMENTS

| | | |
|---|---|---|
| 2016/0140040 A1 | 5/2016 | Mukherjee |
| 2016/0140047 A1 | 5/2016 | Mukherjee et al. |
| 2016/0140051 A1* | 5/2016 | Kessler ................. G06F 3/0604 711/119 |
| 2017/0286335 A1 | 10/2017 | Avoinne et al. |
| 2019/0163645 A1 | 5/2019 | Zeng et al. |
| 2019/0332550 A1 | 10/2019 | Norman et al. |
| 2020/0242049 A1 | 7/2020 | Loh et al. |
| 2021/0064528 A1 | 3/2021 | Ishii et al. |
| 2021/0173651 A1 | 6/2021 | Mukherjee |
| 2022/0327062 A1 | 10/2022 | Swaine |
| 2023/0064603 A1* | 3/2023 | Blasco ................. G06F 12/0811 |
| 2024/0320157 A1 | 9/2024 | Montero et al. |

OTHER PUBLICATIONS

International Search Report and Written Opinion for International Patent Application No. PCT/US2024/013993, mailed Jun. 6, 2024, 12 pages.

Notice of Submission of Opinion for Korean Patent Application No. 10-2025-7029398, mailed Oct. 14, 2025, 23 pages.

\* cited by examiner

EXEMPLARY INSTRUCTION SEQUENCE 100

```
102 — STR Xd, [Xn]              ; Updates to the page table entry (PTE)
104 — DSB <sy>                  ; Ensure global observation of PTE update
106 — TLBI VAE1<nsh|is|os> Xt   ; Invalidate TLB entries for updated PTE
108 — DSB <sy>                  ; Ensures completion of TLBI
110 — ISB                       ; Synchronizes context on this processor
```

FIG. 1

FILTERING REMOTE DATA SYNCHRONIZATION BARRIER (DSB) INSTRUCTION EXECUTION IN PROCESSOR-BASED DEVICES

PRIORITY APPLICATION

The present application is a continuation of and claims priority to U.S. patent application Ser. No. 18/188,200, filed Mar. 22, 2023 and entitled "FILTERING REMOTE DATA SYNCHRONIZATION BARRIER (DSB) INSTRUCTION EXECUTION IN PROCESSOR-BASED DEVICES," which is incorporated herein by reference in its entirety.

BACKGROUND

I. Field of the Disclosure

The technology of the disclosure relates generally to translation lookaside buffers (TLB) in processor-based devices, and, in particular, to controlling execution of Data Synchronization Barrier (DSB) operations responsive to TLB invalidate (TLBI) instructions.

II. Background

Microprocessors, also referred to herein as "processors," perform computational tasks for a wide variety of applications. Conventional processors make use of virtual memory, which refers to a memory management mechanism that maps memory addresses (i.e., virtual addresses or VAs) referenced by executing processes to physical addresses (PAs) within system memory. By using virtual memory, processor-based systems are able to provide access to a virtual memory space larger than the actual physical memory space, and to enhance inter-process security through memory isolation. The mapping of VAs to their corresponding PAs is accomplished using data structures known as page tables. To further improve performance, page table entries retrieved from the page tables during VA-to-PA translations are cached in a data structure referred to as a translation lookaside buffer, or TLB. As new translations are generated, the TLB is updated to store the new translations to handle current and/or anticipated data needs.

Because a processor-based device may contain multiple processors, each of which may include multiple TLBs, mechanisms are provided to ensure that translations stored across the different TLBs remain consistent. For example, when a virtual machine (VM) being executed by a processor is shut down, an issuing processor sends a TLB invalidation (TLBI) instruction to other remote processors to ensure that all cached translations relating to the VM are invalidated in the TLBs of the remote processors. In addition, the issuing processor may send a Data Synchronization Barrier (DSB) instruction to the remote processors, instructing them to perform DSB operations to ensure that any memory requests initiated by the remote processors using the invalidated translations are completed before the updated contents of the TLB are made available for new VA-to-PA translations. Because the cached translations may be stored in any TLB within the various processors, the DSB instruction must be propagated to and executed by each remote processor, which may disrupt the operations of each remote processor and cause each remote processor to incur additional latency.

SUMMARY OF THE DISCLOSURE

Aspects disclosed in the detailed description include filtering remote data synchronization barrier (DSB) instruction execution in processor-based devices. Related apparatus and methods are also disclosed. In this regard, in some exemplary aspects disclosed herein, a processor-based device provides a plurality of processors, including an issuing processor and a remote processor. As used herein, the term "issuing processor" refers to a processor that broadcasts a translation lookaside buffer (TLB) invalidation (TLBI) instruction and a DSB instruction to invalidate a TLB entry of a TLB, while the term "remote processor" refers to a processor that receives such broadcasts. In exemplary operation, the remote processor receives, from the issuing processor, the TLBI instruction indicating a request to invalidate a TLB entry of a plurality of TLB entries of a TLB of the remote processor. The remote processor also receives a DSB instruction from the issuing processor. Using a DSB filter circuit associated with the TLB, the remote processor determines whether the TLBI instruction satisfies filtering criteria, which specify conditions under which execution of the DSB instruction by the remote processor is unnecessary. If the remote processor determines that the TLBI instruction satisfies the filtering criteria, the remote processor foregoes execution of a DSB operation corresponding to the DSB instruction and issues an early DSB acknowledgement to the issuing processor. In this manner, unnecessary execution of DSB operations by the remote processor conserves processor resources and minimizes TLB invalidation latency and performance degradation. In some aspects, if the remote processor determines that the TLBI instruction does not satisfy the filtering criteria, the remote processor executes the DSB operation corresponding to the DSB instruction, and, upon completion of execution of the DSB operation, issues a DSB acknowledgement to the issuing processor in conventional fashion.

Some aspects may provide that the DSB filter circuit comprises a TLBI filter (e.g., a Bloom filter, as a non-limiting example) that may be used to determine whether the corresponding TLB stores a TLB entry associated with the TLBI instruction (and thus whether the TLBI instruction needs to be executed by the remote processor). In such aspects, the DSB filter circuit may determine whether the TLBI instruction satisfies the filtering criteria by determining whether the TLBI filter indicates that an identifier (such as a virtual machine identifier (VMID), an address space identifier (ASID), or a virtual address (VA) identifier, as non-limiting examples) associated with the TLBI instruction is not stored in the TLBI filter. If no such identifier is not stored in the TLBI filter, the remote processor can forego execution of both the TLBI instruction and the DSB instruction. In some aspects, the TLBI filter comprises a VMID filter, and determining whether the TLBI filter indicates that an identifier associated with the TLBI instruction is not stored in the TLBI filter includes determining whether the VMID filter indicates that the VMID of the TLBI instruction is not stored in the VMID filter. Some aspects provide that the TLBI filter comprises an ASID filter, and determining whether the TLBI filter indicates that an identifier associated with the TLBI instruction is not stored in the TLBI filter comprise determining whether the ASID filter indicates that the ASID of the TLBI instruction is not stored in the ASID filter. According to some aspects, the TLBI filter comprises a VA identifier filter, and determining whether the TLBI filter indicates that an identifier associated with the TLBI instruction is not stored in the TLBI filter comprises determining whether the VA identifier filter indicates that the VA identifier of the TLBI instruction is not stored in the VA identifier filter. Aspects of the DSB filter circuit that comprise a TLBI filter may also provide that the remote processor may regenerate the TLBI filter (e.g., by removing, from the TLBI filter, an indication that an identifier associated with the TLBI instruction is stored in the TLBI filter) after execution of the TLBI instruction, if such execution is necessary.

Some aspects may provide that the DSB filter circuit provides an ASID/VMID context table, which is used to track ASIDs and VMIDs stored in the TLB for different processor contexts, and a corresponding eviction filter that is updated to indicate that a given translation was evicted from the TLB. Such aspects may provide that determining whether the TLBI instruction satisfies the filtering criteria may include determining whether the ASID/VMID context table indicates a miss on the ASID and the VMID associated with the TLBI instruction, and further determining whether the eviction filter indicates that that a translation identifier of a translation associated with the TLBI instruction is not stored in the eviction filter. In such aspects, if the ASID and the VMID associated with the TLBI instruction miss on the ASID/VMID context table and the translation associated with the TLBI instruction is not stored in the eviction filter, the remote processor can forego execution of the DSB instruction.

In some aspects, the DSB filter circuit may provide a VA region context table that is used to track VA regions accessed by the remote processor, and a corresponding eviction filter that is updated to indicate that a given translation was evicted from the TLB. According to such aspects, determining whether the TLBI instruction satisfies the filtering criteria may include determining whether VA region context table indicates a miss on the VA region associated with the TLBI instruction, and further determining whether the eviction filter indicates that that a translation identifier of a translation associated with the TLBI instruction is not stored in the eviction filter. If both conditions are met, the remote processor can forego execution of the DSB instruction.

In another aspect, a processor-based device is disclosed. The processor-based device comprises a plurality of processors that includes a remote processor and an issuing processor. The remote processor comprises a TLB comprising a plurality of TLB entries, and a DSB filter circuit corresponding to the TLB and comprising filtering criteria. The remote processor is configured to receive, from an issuing processor of the plurality of processors, a TLBI instruction indicating a request to invalidate a TLB entry of the plurality of TLB entries. The remote processor is further configured to receive, from the issuing processor, a DSB instruction. The remote processor is also configured to determine, using the DSB filter circuit, whether the TLBI instruction satisfies filtering criteria. The remote processor is additionally configured to, responsive to determining that the TLBI instruction satisfies the filtering criteria, forego execution of a DSB operation corresponding to the DSB instruction by the remote processor, and issue an early DSB acknowledgement to the issuing processor.

In another aspect, a processor-based device is disclosed. The processor-based device comprises means for storing a translation lookaside buffer (TLB) comprising a plurality of TLB entries. The processor-based device further comprises means for storing filtering criteria corresponding to the TLB. The processor-based device also comprises means for receiving, from an issuing processor of a plurality of processors of the processor-based device, a TLBI instruction indicating a request to invalidate a TLB entry of a plurality of TLB entries of a TLB. The processor-based device additionally comprises means for receiving, from the issuing processor, a DSB instruction. The processor-based device further comprises means for determining whether the TLBI instruction satisfies filtering criteria. The processor-based device also comprises means for foregoing execution of a DSB operation corresponding to the DSB instruction, responsive to determining that the TLBI instruction satisfies the filtering criteria. The processor-based device additionally comprises means for issuing an early DSB acknowledgement to the issuing processor, responsive to determining that the TLBI instruction satisfies the filtering criteria.

In another aspect, a method for filtering remote DSB instruction execution is disclosed. The method comprises receiving, by a remote processor of a plurality of processors of a processor-based device from an issuing processor of the plurality of processors, a first TLBI instruction indicating a first request to invalidate a first TLB entry of a plurality of TLB entries of a TLB of the remote processor. The method further comprises receiving, by the remote processor from the issuing processor, a first DSB instruction. The method also comprises determining, by the remote processor using a DSB filter circuit, that the first TLBI instruction satisfies filtering criteria of the DSB filter circuit. The method additionally comprises, responsive to determining that the first TLBI instruction satisfies the filtering criteria, foregoing execution of a first DSB operation corresponding to the first DSB instruction by the remote processor, and issuing a first early DSB acknowledgement to the issuing processor.

In another aspect, a non-transitory computer-readable medium is disclosed. The non-transitory computer-readable medium stores computer-executable instructions that, when executed, cause a processor of a processor-based device to receive, from an issuing processor of a plurality of processors, a TLBI instruction indicating a request to invalidate a TLB entry of a plurality of TLB entries of a TLB of the processor. The computer-executable instructions further cause the processor to receive, from the issuing processor, a DSB instruction. The computer-executable instructions also cause the processor to determine whether the TLBI instruction satisfies filtering criteria. The computer-executable instructions additionally cause the processor to, responsive to determining that the TLBI instruction satisfies the filtering criteria, forego execution of a DSB operation corresponding to the DSB instruction, and issue an early DSB acknowledgement to the issuing processor.

BRIEF DESCRIPTION OF THE FIGURES

FIG. 1 illustrates an exemplary instruction sequence for accomplishing translation lookaside buffer (TLB) invalidation, according to some aspects;

DETAILED DESCRIPTION

Figure 2:
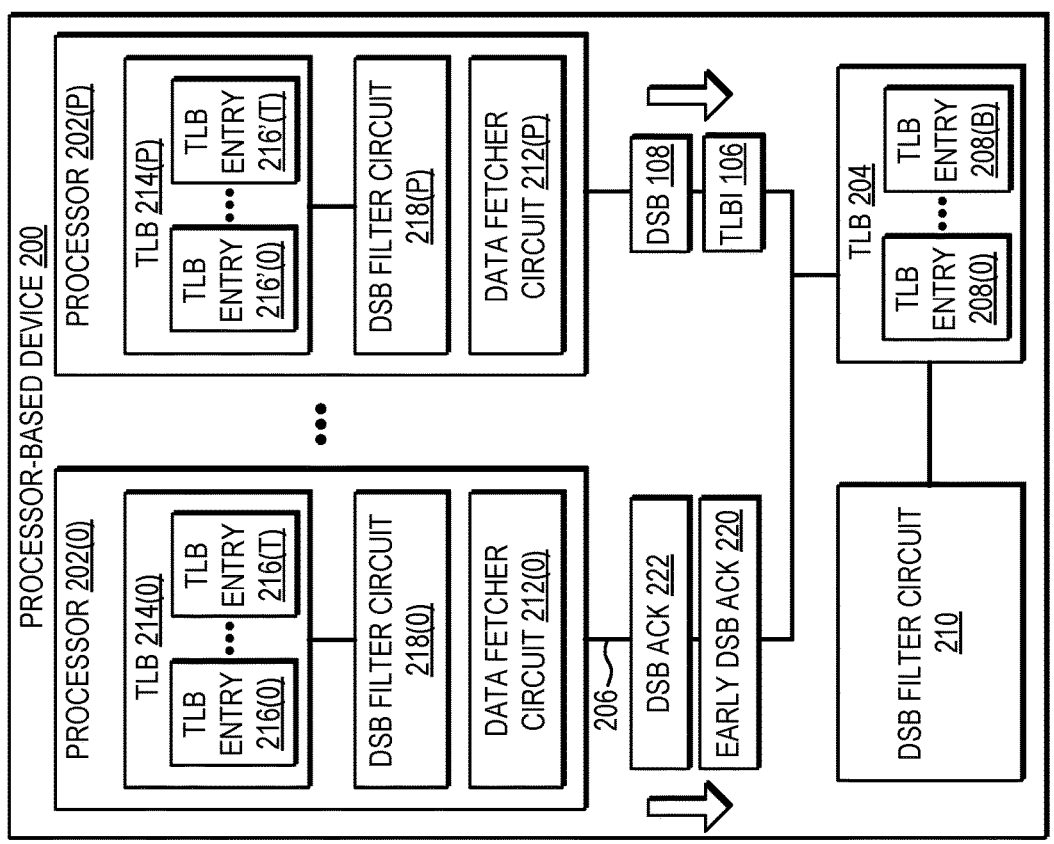
FIG. 2 is a block diagram of an exemplary processor-based device including a data synchronization barrier (DSB) filter circuit of a remote processor, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include filtering remote data synchronization barrier (DSB) instruction execution in processor-based devices. Related apparatus and methods are also disclosed. In this regard, in some exemplary aspects disclosed herein, a processor-based device provides a plurality of processors, including an issuing processor and a remote processor. As used herein, the term "issuing processor" refers to a processor that broadcasts a translation lookaside buffer (TLB) invalidation (TLBI) instruction and a DSB instruction to invalidate a TLB entry of a TLB, while the term "remote processor" refers to a processor that receives such broadcasts. In exemplary operation, the remote processor receives, from the issuing processor, the TLBI instruction indicating a request to invalidate a TLB entry of a plurality of TLB entries of a TLB of the remote processor. The remote processor also receives a DSB instruction from the issuing processor. Using a DSB filter circuit associated with the TLB, the remote processor determines whether the TLBI instruction satisfies filtering criteria, which specify conditions under which execution of the DSB instruction by the remote processor is unnecessary. If the remote processor determines that the TLBI instruction satisfies the filtering criteria, the remote processor foregoes execution of a DSB operation corresponding to the DSB instruction and issues an early DSB acknowledgement to the issuing processor. In this manner, unnecessary execution of DSB operations by the remote processor conserves processor resources and minimizes TLB invalidation latency and performance degradation. In some aspects, if the remote processor determines that the TLBI instruction does not satisfy the filtering criteria, the remote processor executes the DSB operation corresponding to the DSB instruction, and, upon completion of execution of the DSB operation, issues a DSB acknowledgement to the issuing processor in conventional fashion.

Some aspects may provide that the DSB filter circuit comprises a TLBI filter (e.g., a Bloom filter, as a non-limiting example) that may be used to determine whether the corresponding TLB stores a TLB entry associated with the TLBI instruction (and thus whether the TLBI instruction needs to be executed by the remote processor). In such aspects, the DSB filter circuit may determine whether the TLBI instruction satisfies the filtering criteria by determining whether the TLBI filter indicates that an identifier (such as a virtual machine identifier (VMID), an address space identifier (ASID), or a virtual address (VA) identifier, as non-limiting examples) associated with the TLBI instruction is not stored in the TLBI filter. If no such identifier is not stored in the TLBI filter, the remote processor can forego execution of both the TLBI instruction and the DSB instruction. In some aspects, the TLBI filter comprises a VMID filter, and determining whether the TLBI filter indicates that an identifier associated with the TLBI instruction is not stored in the TLBI filter includes determining whether the VMID filter indicates that the VMID of the TLBI instruction is not stored in the VMID filter. Some aspects provide that the TLBI filter comprises an ASID filter, and determining whether the TLBI filter indicates that an identifier associated with the TLBI instruction is not stored in the TLBI filter comprise determining whether the ASID filter indicates that the ASID of the TLBI instruction is not stored in the ASID filter. According to some aspects, the TLBI filter comprises a VA identifier filter, and determining whether the TLBI filter indicates that an identifier associated with the TLBI instruction is not stored in the TLBI filter comprises determining whether the VA identifier filter indicates that the VA identifier of the TLBI instruction is not stored in the VA identifier filter. Aspects of the DSB filter circuit that comprise a TLBI filter may also provide that the remote processor may regenerate the TLBI filter (e.g., by removing, from the TLBI filter, an indication that an identifier associated with the TLBI instruction is stored in the TLBI filter) after execution of the TLBI instruction, if such execution is necessary.

Some aspects may provide that the DSB filter circuit provides an ASID/VMID context table, which is used to track ASIDs and VMIDs stored in the TLB for different processor contexts, and a corresponding eviction filter that is updated to indicate that a given translation was evicted from the TLB. Such aspects may provide that determining whether the TLBI instruction satisfies the filtering criteria may include determining whether the ASID/VMID context table indicates a miss on the ASID and the VMID associated with the TLBI instruction, and further determining whether the eviction filter indicates that that a translation identifier of a translation associated with the TLBI instruction is not stored in the eviction filter. In such aspects, if the ASID and the VMID associated with the TLBI instruction miss on the ASID/VMID context table and the translation associated with the TLBI instruction is not stored in the eviction filter, the remote processor can forego execution of the DSB instruction.

In some aspects, the DSB filter circuit may provide a VA region context table that is used to track VA regions accessed by the remote processor, and a corresponding eviction filter that is updated to indicate that a given translation was evicted from the TLB. According to such aspects, determining whether the TLBI instruction satisfies the filtering criteria may include determining whether VA region context table indicates a miss on the VA region associated with the TLBI instruction, and further determining whether the eviction filter indicates that that a translation identifier of a translation associated with the TLBI instruction is not stored in the eviction filter. If both conditions are met, the remote processor can forego execution of the DSB instruction.

Before discussing filtering of remote DSB instruction execution in greater detail, the operations performed by an issuing processor when initiating a conventional TLB invalidation process are first described. In this regard, FIG. 1 illustrates an exemplary instruction sequence 100 that may be performed by an issuing processor of a plurality of processors of a processor-based device. The issuing processor executes the exemplary instruction sequence 100 to update a page table entry (PTE) of the issuing processor, and to ensure that any TLB entries stored in TLBs of other remote processors of the plurality of processors are also updated. Thus, as seen in FIG. 1, the issuing processor first executes an STR instruction 102 to update the PTE by storing a value stored in a register Xd into a memory location indicated by an address Xn, and then executes a DSB instruction 104 to ensure global observation of the PTE update by all processors of the processor-based device as indicated by the "sy" parameter. The issuing processor then executes a TLBI instruction 106, which is broadcast to other remote processors to invalidate any TLB entries for the PTE in any TLBs of the remote processors. The issuing processor also executes a DSB instruction 108, which is also broadcast to the remote processors to instruct the remote processors to perform DSB operations to ensure that older translations and memory requests are updated before the updated TLB is used for new translations. Finally, the issuing processor executes an ISB instruction 110 to synchronize the context on the issuing processor.

In response to the broadcast of the DSB instruction 108, the remote processor conventionally performs the DSB operation, and then transmits an acknowledgement back to the issuing processor to signal completion of the DSB operation. When the issuing processor receives acknowledgements of the completion for such DSB operations from all other remote processors, the DSB operations across all the processors are synchronized. The TLB of the issuing processor can then be updated with new translation information that can be used for performing translations for new instructions. However, this process for executing the DSB operations by the remote processors may consume significant processor resources, thus contributing to TLB invalidation latency and performance degradation as a result.

In this regard, FIG. 2 is a diagram of an exemplary processor-based device 200 that includes a plurality of processors 202(0)-202(P) that are configured to filter remote DSB instruction execution. The processors 202(0)-202(P), which also may be referred to as "processor cores" or "central processing unit (CPU) cores," may be in-order or out-of-order processors (OoPs), and may be implemented on one System-on-Chip (SoC) or distributed across multiple SoCs. The processor-based device 200 comprises a TLB 204 which is coupled to the plurality of processors 202(0)-202(P) via an interconnect bus 206, and which stores a plurality of TLB entries 208(0)-208(B). The TLB 204 is also associated with a DSB filter circuit 210 that can be used to determine, e.g., whether cache entries for a specific VM, a specific address space, and/or a specific VA is not stored in the associated TLB 204. In some implementations, the DSB filter circuit 210 may comprise a Bloom filter that is associated with (e.g., represents) a set of elements and that is a probabilistic data structure configured to provide rapid and memory efficient information regarding whether or not a queried element is present in the set. For example, a Bloom filter associated with TLB 204 can provide an indication regarding whether or not a TLB entry 208(0)-208(B) for a specific VM, a specific address space, or a specific VA is present in the TLB 204 associated with the Bloom filter.

Each of the plurality of processors 202(0)-202(P) comprises a respective data fetcher circuit 212(0)-212(P) to control cache fetching (including cache prefetching) associated with the respective processor 202(0)-202(P). The plurality of processors 202(0)-202(P) further include corresponding TLBs 214(0)-214(P) storing corresponding TLB entries 216(0)-216(T), 216'(0)-216'(T). The TLBs 214(0)-214(P) each may comprise, e.g., an instruction TLB or a data TLB. The TLB entries 216(0)-216(T), 216'(0)-216'(T) cache address translations, and may comprise corresponding TLB tags (not shown) and data elements (not shown). Each of the TLB tags may include a page VA, and may also include an ASID (not shown) to associate the corresponding TLB entry 216(0)-216(T), 216'(0)-216'(T) with an application space to enable processor context switches without requiring the TLB 204 to be invalidated, and a VMID (not shown) to enable hypervisor VM switches without requiring the TLB 204 to be invalidated. Each data element may comprise a corresponding physical address (PA) for the TLB entry 216(0)-216(T), 216'(0)-216'(T). The TLB entries 216(0)-216(T), 216'(0)-216'(T) may further include additional metadata not shown in FIG. 1, such as validity indicators, global indicators, and/or memory properties such as type and access permissions.

Each of the TLBs 214(0)-214(P) is associated with a corresponding DSB filter circuit 218(0)-218(P) that can be used to determine whether the respective processors 202(0)-202(P) can forego execution of a DSB operation corresponding to a DSB instruction sent by an issuing processor among the processors 202(0)-202(P). For example, the DSB filter circuits 218(0)-218(P) may determine whether TLB entries 216(0)-216(T), 216'(0)-216'(T) for a specific VM, a specific address space, or a specific VA is not stored in the associated TLBs 214(0)-214(P). The DSB filter circuits 218(0)-218(P) in some aspects may comprise a Bloom filter, as a non-limiting example.

In exemplary operation, the TLBI instruction 106 of FIG. 1 is received at a remote processor (e.g., the processor 202(0) of FIG. 2) from an issuing processor (e.g., the processor 202(P) of FIG. 2). The TLBI instruction (captioned as "TLBI" in FIG. 2) 106 identifies one or more entries of an associated TLB to be invalidated (e.g., cleared). In some aspects, the TLBI instruction 106 may include one or more identifiers that includes any of a VMID, an ASID, and a virtual address identifier (VAID), and thus is an instruction to the remote processor 202(0) to invalidate cache entries for the VMID, ASID (if specified), and VAID (if specified) included in the TLBI instruction 106. The DSB instruction (captioned as "DSB" in FIG. 2) 108 of FIG. 1 is also received by the remote processor 202(0) from the issuing processor 202(P). The DSB instruction 108 instructs the remote processor 202(0) to perform DSB operations to ensure that older translations and memory requests are updated before the updated TLB is used for new translations.

The remote processor 202(0) then determines, using the DSB filter circuit 218(0), whether the TLBI instruction 106 satisfies filtering criteria, which specify conditions under which execution of the DSB instruction 108 by the remote processor 202(0) is unnecessary. For example, the DSB filter circuit 218(0) may determine that the TLB 214(0) does not store any cache entries associated with an identifier specified in the TLBI instruction 106. If the DSB filter circuit 218(0) determines that the TLBI instruction 106 satisfies the filtering criteria, the remote processor 202(0) foregoes execution of a DSB operation corresponding to the DSB instruction 108 and issues an early DSB acknowledgement (captioned as "EARLY DSB ACK" in FIG. 2) 220 to the issuing processor 202(P). The early DSB acknowledgement 220 is referred to as "early" herein because it is issued by the remote processor 202(0) without executing, or waiting for the results of, a DSB operation corresponding to the DSB instruction 108. In some aspects, however, if the remote processor 202(0) determines that the TLBI instruction 106 does not satisfy the filtering criteria, the remote processor 202(0) executes the DSB operation corresponding to the DSB instruction 108. Upon completion of execution of the DSB operation, the remote processor 202(0) issues a DSB acknowledgement (captioned as "DSB ACK" in FIG. 2) 222 to the issuing processor 202(P) (i.e., in conventional fashion).

Figure 3:
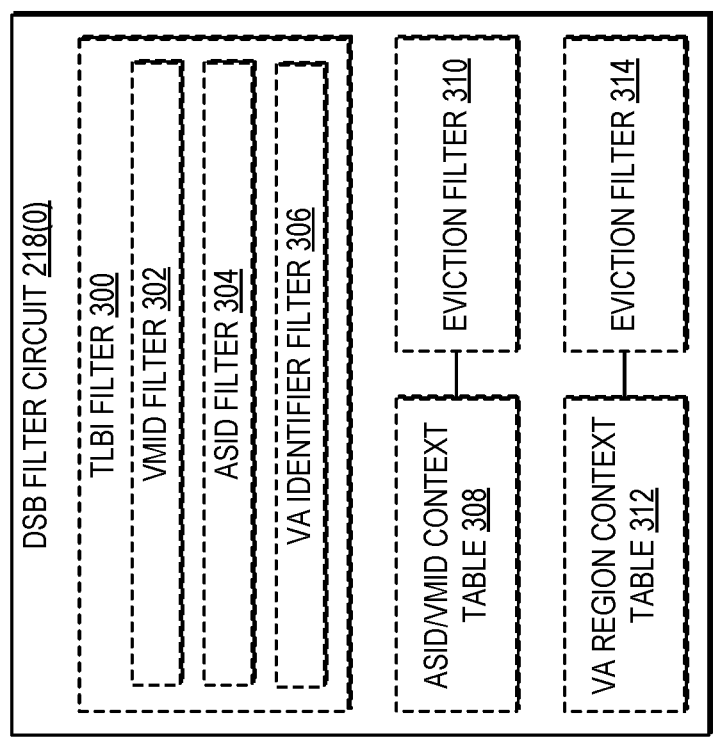
FIG. 3 is a block diagram illustrating in greater detail exemplary elements and operations of the DSB filter circuit of FIG. 2 for determining whether a TLB invalidation (TLBI) instruction satisfies DSB filter criteria, according to some aspects.

FIG. 3 illustrates in greater detail exemplary elements and operations of a DSB filter circuit, such as the DSB filter circuit 218(0) of the remote processor 202(0) of FIG. 2, for determining whether the TLBI instruction 106 satisfies DSB filter criteria, according to some aspects. Some aspects may provide that the DSB filter circuit 218(0) provides a TLBI filter 300. The TLBI filter 300 may comprise a Bloom filter, which is a data structure (e.g., a look-up table) that includes information regarding (e.g., information representing, indicating, or identifying) which TLB entries 216(0)-216(T) may be stored in the TLB 214(0) associated with the Bloom filter. In general, the Bloom filter is updated as new TLB entries 216(0)-216(T) are stored in the TLB 214(0) associated with the Bloom filter. However, the Bloom filter is not always updated once a TLB entry 216(0)-216(T) is no longer stored in the associated TLB 214(0), such as when a TLB entry 216(0)-216(T) is evicted from the TLB 214(0). Thus, a Bloom filter may provide a false indication that a TLB entry 216(0)-216(T) associated with a particular VM, an address space, or a VA is not stored in the TLB 214(0) even if the TLB entry 216(0)-216(T) is no longer stored at the TLB 214(0). However, if a Bloom filter indicates that a TLB entry 216(0)-216(T) associated with a particular VM, an address space, or a VA is not stored in the TLB 214(0), one can be certain that TLB entries 216(0)-216(T) associated with the particular VM, the address space, or the VA are definitely not stored in the TLB 214(0). Thus, while a Bloom filter may provide a false positive, a Bloom filter does not provide false negatives.

As noted above, as new TLB entries 216(0)-216(T) are added to the TLB 214(0) of the remote processor 202(0), the TLBI filter 300 is updated to store information regarding the newly added TLB entries 216(0)-216(T). For example, some aspects may provide that the TLBI filter 300 comprises a VMID filter 302. If a new TLB entry 216(0)-216(T) that includes a VMID is not stored in the TLB 214(0), the VMID filter 302 is updated to store information to indicate that the TLB 214(0) stores at least one TLB entry 216(0)-216(T) with the VMID. Some aspects may provide that the TLBI filter 300 comprises an ASID filter 304, such that the addition of a new TLB entry 216(0)-216(T) including an ASID to the TLB 214(0) causes the ASID filter 304 to be updated to store information to indicate that the TLB 214(0) stores at least one TLB entry 216(0)-216(T) with the ASID. According to some aspects, the TLBI filter 300 may comprise a VA identifier filter 306. In such aspects, if a new TLB entry 216(0)-216(T) that includes a VA identifier is not stored in the TLB 214(0), the VA identifier filter 306 is updated to store information to indicate that the TLB 214(0) stores at least one TLB entry 216(0)-216(T) with the VA identifier.

The DSB filter circuit 218(0) in these aspects is configured to determine whether the TLBI instruction 106 satisfies the DSB filter criteria by determining whether the TLBI filter 300 indicates that an identifier associated with the TLBI instruction 106 is not stored in the TLBI filter 300. Thus, for example, aspects in which the TLBI filter 300 comprises a VMID filter 302 may provide that determining whether the TLBI filter 300 indicates that an identifier associated with the TLBI instruction 106 is not stored in the TLBI filter 300 comprises determining whether the VMID filter 302 indicates that the VMID of the TLBI instruction 106 is not stored in the VMID filter 302. Aspects in which the TLBI filter 300 comprises an ASID filter 304 may provide that operations for determining whether the TLBI filter 300 indicates that an identifier associated with the TLBI instruction 106 is not stored in the TLBI filter 300 comprise determining whether the ASID filter 304 indicates that the ASID of the TLBI instruction 106 is not stored in the ASID filter 304. According to aspects in which the TLBI filter 300 comprises a VA identifier filter 306, determining whether the TLBI filter 300 indicates that an identifier associated with the TLBI instruction 106 is not stored in the TLBI filter 300 may comprise determining whether the VA identifier filter 306 indicates that the VA identifier of the TLBI instruction 106 is not stored in the VA identifier filter 306.

In aspects providing a TLBI filter 300, if the DSB filter circuit 218(0) determines that the TLB 214(0) does not store any TLB entries 216(0)-216(T) associated with an identifier (e.g., the VMID, the ASID, and/or the VA identifier) specified in the TLBI instruction 106, a DSB operation corresponding to the DSB instruction 108 is not executed by the remote processor 202(0), and the early DSB acknowledgement 220 of FIG. 2 is sent by the remote processor 202(0) to the issuing processor 202(P). If the TLB 214(0) is determined to store a TLB entry 216(0)-216(T) associated with the identifier specified in the TLBI instruction 106, the TLBI instruction 106 and a DSB operation corresponding to the DSB instruction 108 are executed. However, if the DSB filter circuit 218(0) determines that the TLB 214(0) does store one or more TLB entries 216(0)-216(T) associated with the identifier specified in the TLBI instruction 106, a DSB operation corresponding to the DSB instruction 108 is executed by the remote processor 202(0) (i.e., after execution of the TLBI instruction 106), and the DSB acknowledgement 222 is then sent to the issuing processor 202(P). The remote processor 202(0) in some aspects may also regenerate the TLBI filter 300 (e.g., after executing the TLBI instruction 106) by removing the indication that the identifier associated with the TLBI instruction 106 is stored in the TLBI filter 300.

Some aspects may provide that, even if the TLBI instruction 106 is executed by the remote processor 202(0), the subsequent execution of a DSB operation corresponding to the DSB instruction 108 may still be avoided if the DSB filter circuit 218(0) is able to determine that the invalidated TLB translation is not in use by the remote processor 202(0). For example, some such aspects may provide that the DSB filter circuit 218(0) provides an ASID/VMID context table 308 and a corresponding eviction filter 310. The ASID/VMID context table 308 is used by the remote processor 202(0) to track ASID and VMID combinations that identify different processor contexts and that correspond to the TLB entries 216(0)-216(T), while the eviction filter 310 may be used to store translation identifiers of translations that are evicted from the TLB 214(0). In such aspects, the DSB filter circuit 218(0) may determine whether the TLBI instruction satisfies the filtering criteria by determining whether the ASID/VMID context table 308 indicates a miss on the ASID and the VMID associated with the TLBI instruction 106, and further determining whether the eviction filter 310 indicates that a translation identifier of a translation associated with the TLBI instruction 106 is not stored in the eviction filter 310.

Similarly, the DSB filter circuit 218(0) in some aspects may provide a VA region context table 312 and a corresponding eviction filter 314. The VA region context table 312 is used by the remote processor 202(0) to track VA regions (i.e., identified by a set of upper bits of VA addresses) that correspond to VAs of the TLB entries 216(0)-216(T). According to such aspects, determining whether the TLBI instruction 106 satisfies the filtering criteria may comprise determining whether VA region context table 312 indicates a miss on the VA region associated with the TLBI instruction 106, and further determining whether the eviction filter 310 indicates that that a translation identifier of a translation associated with the TLBI instruction 106 is not stored in the eviction filter 310.

Figure 4A:
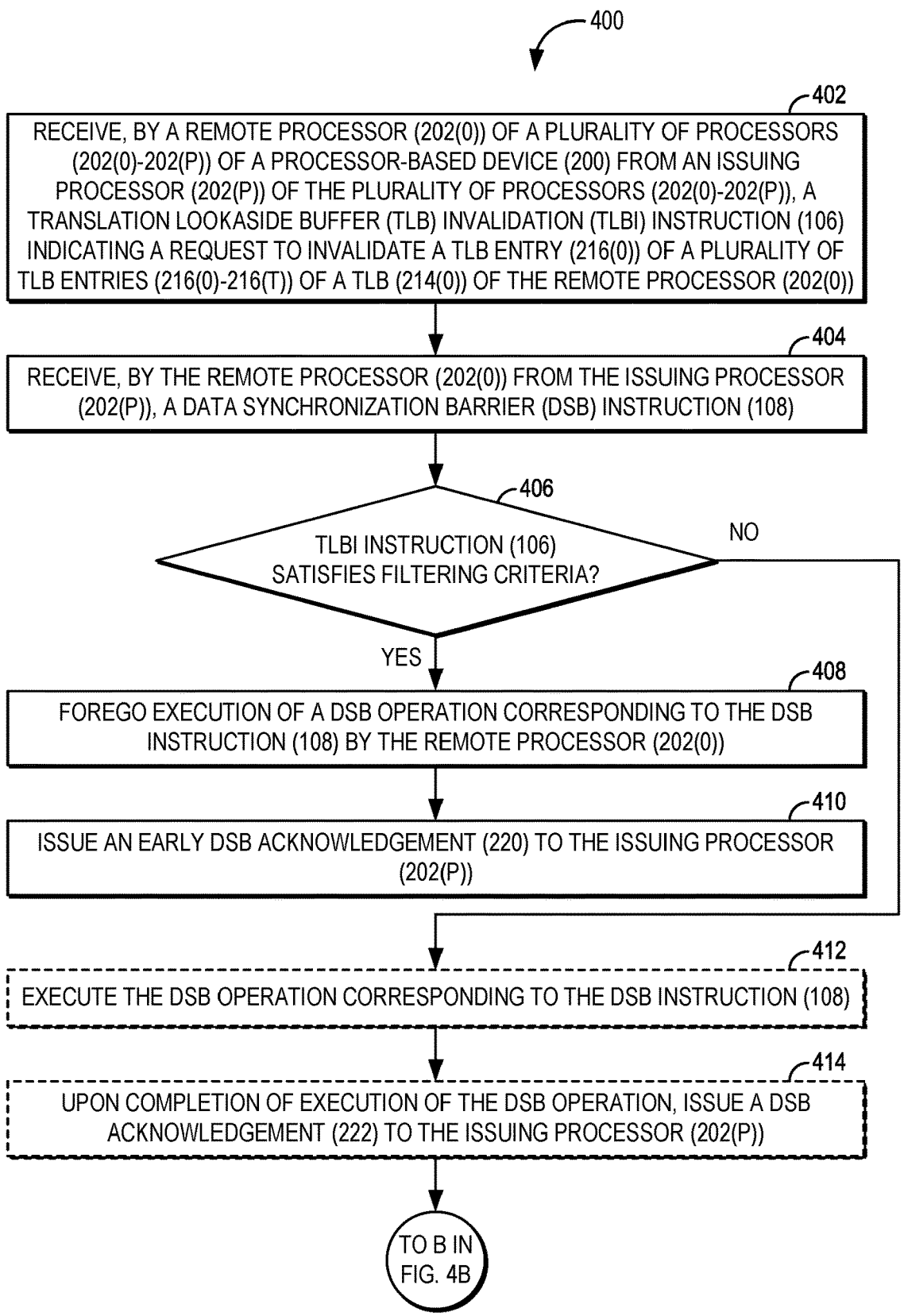
FIGS. 4A-4B provide a flowchart illustrating exemplary operations of the remote processor and the DSB filter circuit of FIGS. 2 and 3, according to some aspects.
Figure 4B:
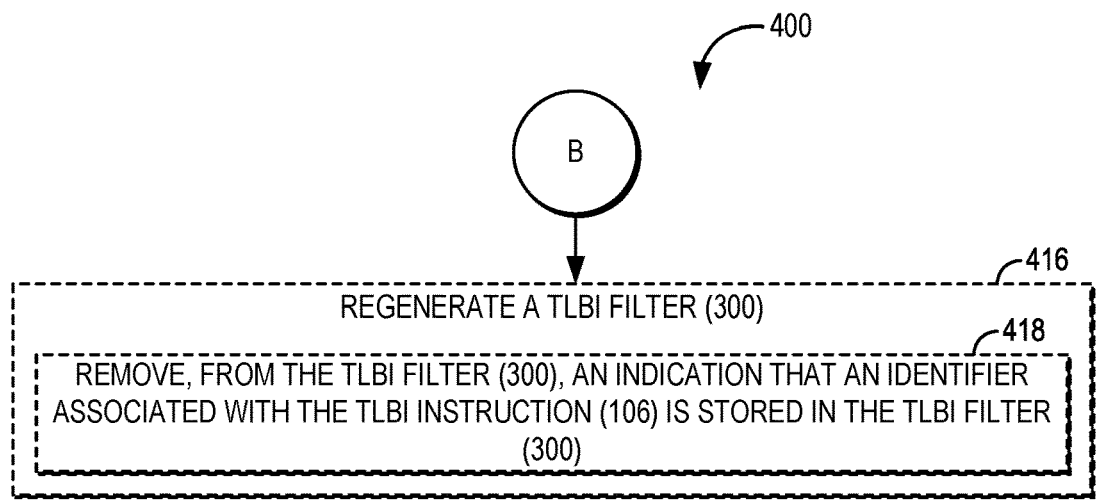

To illustrate exemplary operations of the processor-based device 200 for filtering remote DSB instruction execution using the DSB filter circuits 218(0)-218(P) according to some aspects, FIGS. 4A-4B provide a flowchart illustrating exemplary operations 400. For the sake of clarity, elements of FIGS. 1-3 are referenced in describing FIGS. 4A and 4B. The operations 400 begin in FIG. 4A with a remote processor of a plurality of processors (e.g., the remote processor 202(0) of the plurality of processors 202(0)-202(P) of FIG. 2) of the processor-based device 200 receiving, from an issuing processor (e.g., the issuing processor 202(P) of FIG. 2) of the plurality of processors 202(0)-202(P), a TLBI instruction, such as the TLBI instruction 106 of FIGS. 1 and 2, indicating a request to invalidate a TLB entry of a plurality of TLB entries of a TLB (e.g., the TLB entry 216(0) of the plurality of TLB entries 216(0)-216(T) of the TLB 214(0) of FIG. 2) of the remote processor 202(0) (block 402). The remote processor 202(0) also receives, from the issuing processor 202(P), a DSB instruction such as the DSB instruction 108 of FIGS. 1 and 2 (block 404).

The remote processor 202(0) then determines (e.g., using the DSB filter circuit 218(0) of FIGS. 2 and 3) whether the TLBI instruction 106 satisfies filtering criteria (block 406). Exemplary operations of block 406 for determining whether the TLBI instruction 106 satisfies the filtering criteria are discussed in greater detail below with respect to FIGS. 5A-5B. If the TLBI instruction 106 is determined at decision block 406 of FIG. 4A to satisfy the filtering criteria, the remote processor 202(0) foregoes execution of a DSB operation corresponding to the DSB instruction 108 by the remote processor 202(0) (block 408). The remote processor 202(0) also issues an early DSB acknowledgement (e.g., the early DSB acknowledgement 220 of FIG. 2) to the issuing processor 202(P) (i.e., by issuing the early DSB acknowledgement 220 without waiting for a DSB operation to complete) (block 410). However, if the remote processor 202(0) determines at decision block 406 that the TLBI instruction 106 does not satisfy the filtering criteria, the remote processor 202(0) executes the DSB operation corresponding to the DSB instruction 108 (block 412). Upon completion of execution of the DSB operation, the remote processor 202(0) issue a DSB acknowledgement (e.g., the DSB acknowledgement 222 of FIG. 2) to the issuing processor 202(P) (block 414). The operations 400 in some aspects may continue at block 416 of FIG. 4B.

Referring now to FIG. 4B, in aspects in which the DSB filter circuit 218(0) comprises a TLBI filter such as the TLBI filter 300 of FIG. 3, the remote processor 202(0) may also regenerate the TLBI filter 300 (e.g., after executing the TLBI instruction 106) (block 416). Some such aspects may provide that the operations of block 416 for regenerating the TLBI filter 300 may comprise the remote processor 202(0) removing, from the TLBI filter 300, an indication that an identifier associated with the TLBI instruction 106 is stored in the TLBI filter 300 (block 418).

Figure 5A:
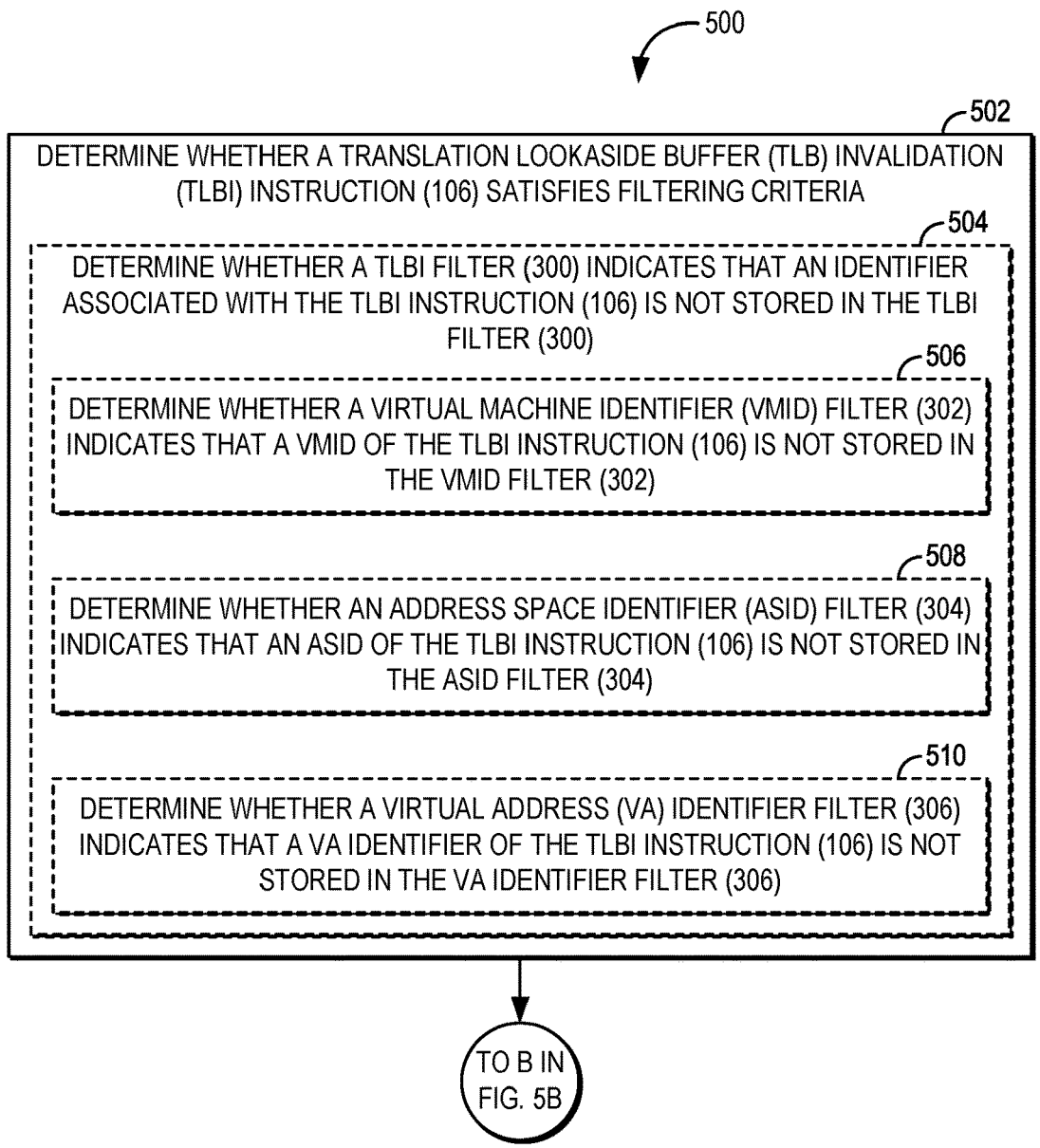
FIGS. 5A-5B provide a flowchart illustrating exemplary operations of the DSB filter circuit of FIGS. 2 and 3 for determining whether a TLBI instruction satisfies filtering criteria, according to some aspects.
Figure 5B:
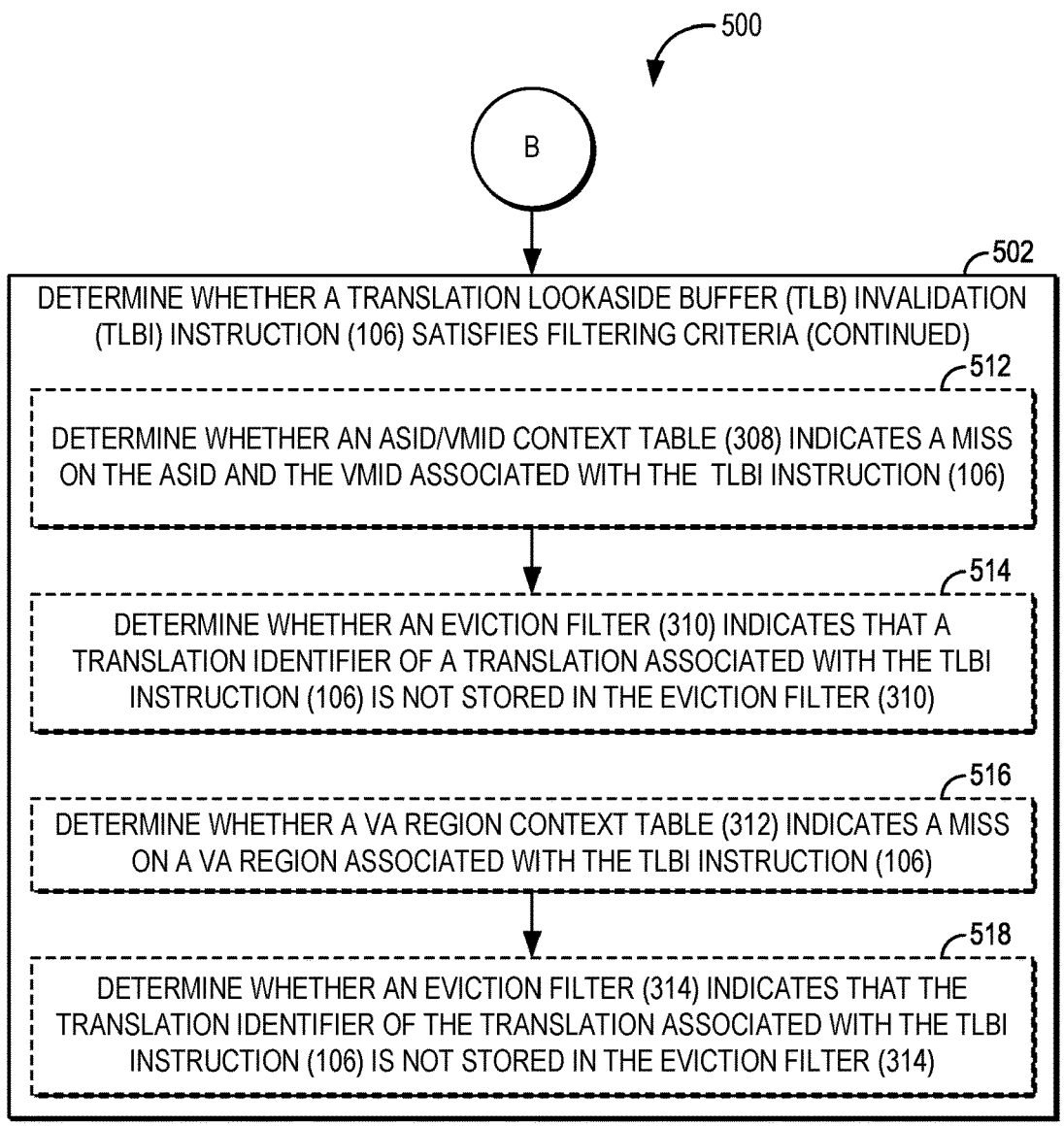

FIGS. 5A-5B provide a flowchart illustrating exemplary operations 500 of the remote processor 202(0) of FIG. 2 for determining whether the TLBI instruction 106 satisfies the filtering criteria according to some aspects. As such, the operations 500 may correspond to the operations of block 406 of FIG. 4A according to some aspects. Elements of elements of FIGS. 1-3 are referenced in describing FIGS. 5A and 5B for the sake of clarity. It is to be understood that some of the operations 500 illustrated in FIGS. 5A and 5B correspond to operations described above with respect to FIGS. 4A and 4B. It is to be further understood that, in some aspects, some of the operations 500 illustrated in FIGS. 5A-5B may be performed in an order other than that illustrated herein, or may be omitted.

The operations 500 begin in FIG. 5A with the remote processor 202(0) determining (e.g., using the DSB filter circuit 218(0) of FIGS. 2 and 3) whether the TLBI instruction 106 satisfies filtering criteria (block 502). In some aspects, the DSB filter circuit 218(0) may provide a TLBI filter, such as the TLBI filter 300 of FIG. 3. In such aspects, the operations of block 502 for determining whether the TLBI instruction 106 satisfies the filtering criteria may comprise determining whether the TLBI filter 300 indicates that an identifier associated with the TLBI instruction 106 is not stored in the TLBI filter 300 (block 504). In aspects in which the TLBI filter 300 comprises a VMID filter such as the VMID filter 302 of FIG. 3, the operations of block 504 for determining whether the TLBI filter 300 indicates that an identifier associated with the TLBI instruction 106 is not stored in the TLBI filter 300 may include determining whether the VMID filter 302 indicates that the VMID of the TLBI instruction 106 is not stored in the VMID filter 302 (block 506). Aspects in which the TLBI filter 300 comprises an ASID filter, such as the ASID filter 304 of FIG. 3, may provide that the operations of block 504 for determining whether the TLBI filter 300 indicates that an identifier associated with the TLBI instruction 106 is not stored in the TLBI filter 300 comprise determining whether the ASID filter 304 indicates that the ASID of the TLBI instruction 106 is not stored in the ASID filter 304 (block 508). According to aspects in which the TLBI filter 300 comprises a VA identifier filter such as the VA identifier filter 306 of FIG. 3, the operations of block 504 for determining whether the TLBI filter 300 indicates that an identifier associated with the TLBI instruction 106 is not stored in the TLBI filter 300 may comprise determining whether the VA identifier filter 306 indicates that the VA identifier of the TLBI instruction 106 is not stored in the VA identifier filter 306 (block 510). The operations 500 in some aspects may continue at block 512 of FIG. 5B.

Turning now to FIG. 5B, some aspects may provide that the DSB filter circuit 218(0) provides an ASID/VMID context table and a corresponding eviction filter, such as the ASID/VMID context table 308 and the eviction filter 310 of FIG. 3. Such aspects may provide that the operations of block 502 for whether the TLBI instruction 106 satisfies the filtering criteria includes determining whether the ASID/VMID context table 308 indicates a miss on the ASID and the VMID associated with the TLBI instruction 106 (block 512). The remote processor 202(0) in such aspects may also determine whether the eviction filter 310 indicates that a translation identifier of a translation associated with the TLBI instruction 106 is not stored in the eviction filter 310 (block 514).

In some aspects, the DSB filter circuit 218(0) may provide a VA region context table and a corresponding eviction filter, such as the VA region context table 312 and the eviction filter 314 of FIG. 3. According to such aspects, the operations of block 502 for determining whether the TLBI instruction 106 satisfies the filtering criteria includes determining whether the VA region context table 312 indicates a miss on the VA region associated with the TLBI instruction 106 (block 516). The remote processor 202(0) in such aspects may also determine whether the eviction filter 314 indicates that a translation identifier of a translation associated with the TLBI instruction 106 is not stored in the eviction filter 314 (block 518).

The processor-based device according to aspects disclosed herein and discussed with reference to FIGS. 2, 3, 4A-4B, and 5A-5B may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
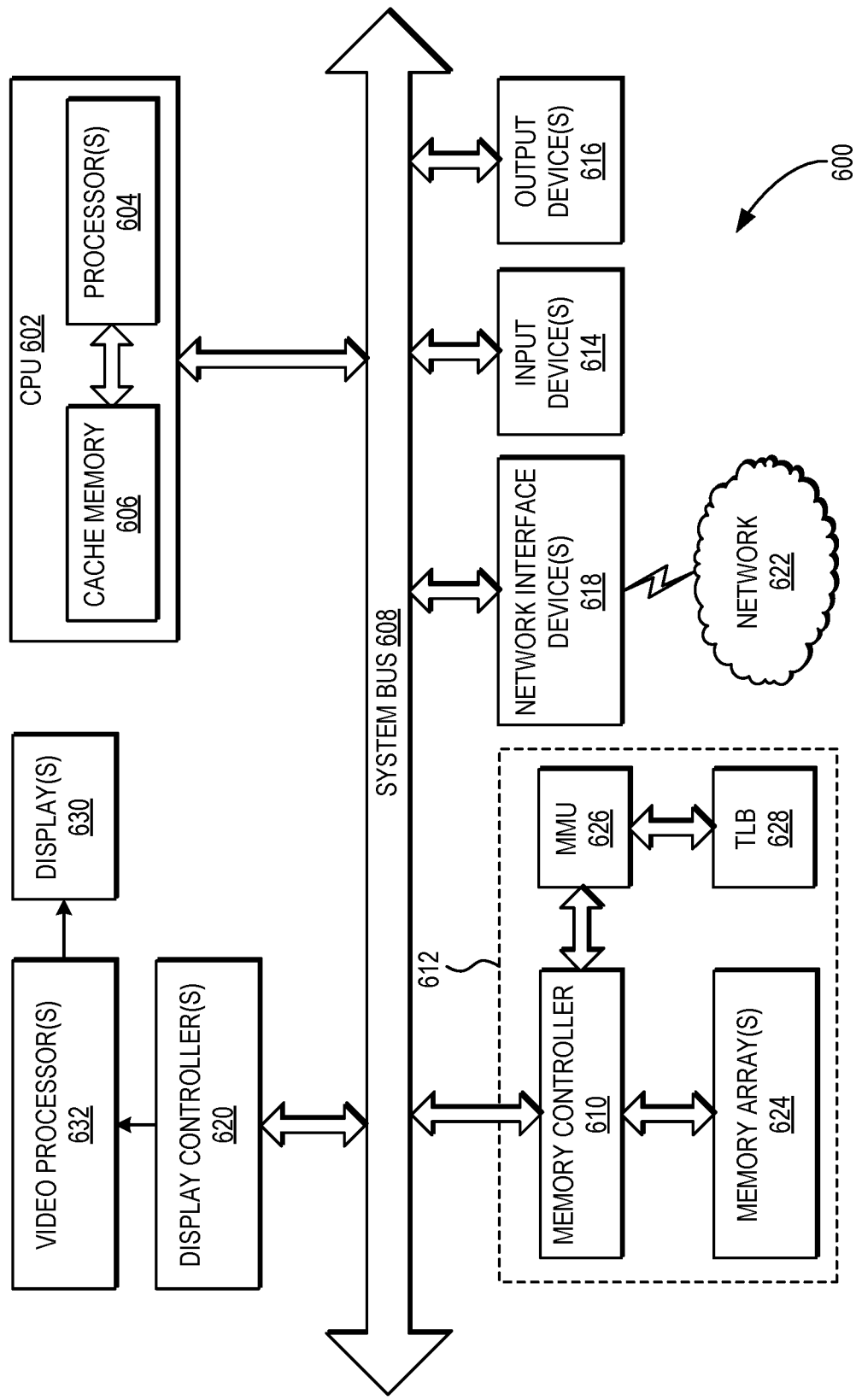
FIG. 6 is a block diagram of an exemplary processor-based device that can include the remote processor of FIG. 2.

In this regard, FIG. 6 illustrates an example of a processor-based device 600 as illustrated and described with respect to FIGS. 2, 3, 4A-4B, and 5A-5B. In this example, the processor-based device 600, which corresponds in functionality to the processor-based device 200 of FIG. 2, includes a CPU 602 which comprises one or more processors 604 coupled to a cache memory 606. The processor(s) 604 is also coupled to a system bus 608 and can intercouple devices included in the processor-based device 600. As is well known, the processor(s) 604 communicates with these other devices by exchanging address, control, and data information over the system bus 608. For example, the processor(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624 and a memory management unit (captioned as "MMU" in FIG. 6) 626, which may be coupled to a TLB 628.

The processor(s) 604 may also be configured to access the display controller(s) 620 over the system bus 608 to control information sent to one or more displays 630. The display controller(s) 620 sends information to the display(s) 630 to be displayed via one or more video processors 632, which process the information to be displayed into a format suitable for the display(s) 630. The display(s) 630 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
    a plurality of processors, comprising a remote processor and an issuing processor;
    the remote processor comprising:
        a translation lookaside buffer (TLB) comprising a plurality of TLB entries; and
        a Data Synchronization Barrier (DSB) filter circuit corresponding to the TLB, the DSB filter circuit comprising filtering criteria; and
    the remote processor configured to:
        receive, from the issuing processor of the plurality of processors, a TLB invalidation (TLBI) instruction indicating a request to invalidate a TLB entry of the plurality of TLB entries;
        receive, from the issuing processor, a DSB instruction;
        determine, using the DSB filter circuit, whether the TLBI instruction satisfies the filtering criteria; and
        responsive to determining that the TLBI instruction satisfies the filtering criteria:
            forego execution of a DSB operation corresponding to the DSB instruction by the remote processor; and
            issue an early DSB acknowledgement to the issuing processor.

2. The processor-based device of clause 1, wherein the remote processor is further configured to, responsive to determining that the TLBI instruction does not satisfy the filtering criteria:
    execute the DSB operation corresponding to the DSB instruction; and
    upon completion of execution of the DSB operation, issue a DSB acknowledgement to the issuing processor.

3. The processor-based device of any one of clauses 1-2, wherein:
    the DSB filter circuit comprises a TLBI filter; and
    the remote processor is configured to determine whether the TLBI instruction satisfies the filtering criteria by being configured to determine whether the TLBI filter indicates that an identifier associated with the TLBI instruction is not stored in the TLBI filter.

4. The processor-based device of clause 3, wherein:
    the TLBI filter comprises a virtual machine identifier (VMID) filter; and
    the remote processor is configured to determine whether the TLBI filter indicates that the identifier associated with the TLBI instruction is not stored in the TLBI filter by being configured to determine whether the VMID filter indicates that a VMID of the TLBI instruction is not stored in the VMID filter.

5. The processor-based device of any one of clauses 3-4, wherein:
    the TLBI filter comprises an address space identifier (ASID) filter; and
    the remote processor is configured to determine whether the TLBI filter indicates that the identifier associated with the TLBI instruction is not stored in the TLBI filter by being configured to determine whether the ASID filter indicates that an ASID of the TLBI instruction is not stored in the ASID filter.

6. The processor-based device of any one of clauses 3-5, wherein:
    the TLBI filter comprises a virtual address (VA) identifier filter; and
    the remote processor is configured to determine whether the TLBI filter indicates that the identifier associated with the TLBI instruction is not stored in the TLBI filter by being configured to determine whether the VA identifier filter indicates that a VA identifier of the TLBI instruction is not stored in the VA identifier filter.

7. The processor-based device of any one of clauses 3-6, wherein the remote processor is further configured to regenerate the TLBI filter.

8. The processor-based device of clause 7, wherein the remote processor is configured to regenerate the TLBI filter by being configured to remove, from the TLBI filter, an indication that the identifier associated with the TLBI instruction is stored in the TLBI filter.

9. The processor-based device of any one of clauses 3-8, wherein the TLBI filter comprises a Bloom filter.

10. The processor-based device of any one of clauses 1-9, wherein:
    the DSB filter circuit comprises:
        an address space identifier (ASID)/virtual machine identifier (VMID) context table; and
        an eviction filter; and
    the remote processor is configured to determine whether the TLBI instruction satisfies the filtering criteria by being configured to:
        determine whether the ASID/VMID context table indicates a miss on an ASID and a VMID associated with the TLBI instruction; and
        determine whether the eviction filter indicates that a translation identifier of a translation associated with the TLBI instruction is not stored in the eviction filter.

11. The processor-based device of any one of clauses 1-10, wherein:
    the DSB filter circuit comprises:
        a virtual address (VA) region context table; and
        an eviction filter; and
    the remote processor is configured to determine whether the TLBI instruction satisfies the filtering criteria by being configured to:
        determine whether the VA region context table indicates a miss on a VA region associated with the TLBI instruction; and
        determine whether the eviction filter indicates that a translation identifier of a translation associated with the TLBI instruction is not stored in the eviction filter.

12. The processor-based device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. A processor-based device, comprising:
   means for storing a translation lookaside buffer (TLB) comprising a plurality of TLB entries;
   means for storing filtering criteria corresponding to the TLB;
   means for receiving, from an issuing processor of a plurality of processors of the processor-based device, a TLB invalidation (TLBI) instruction indicating a request to invalidate a TLB entry of the plurality of TLB entries;
   means for receiving, from the issuing processor, a data synchronization barrier (DSB) instruction;
   means for determining whether the TLBI instruction satisfies the filtering criteria;
   means for foregoing execution of a DSB operation corresponding to the DSB instruction, responsive to determining that the TLBI instruction satisfies the filtering criteria; and
   means for issuing an early DSB acknowledgement to the issuing processor, responsive to determining that the TLBI instruction satisfies the filtering criteria.

14. A method for filtering remote Data Synchronization Barrier (DSB) instruction execution, comprising:
   receiving, by a remote processor of a plurality of processors of a processor-based device from an issuing processor of the plurality of processors, a first translation lookaside buffer (TLB) invalidation (TLBI) instruction indicating a first request to invalidate a first TLB entry of a plurality of TLB entries of a TLB of the remote processor;
   receiving, by the remote processor from the issuing processor, a first DSB instruction;
   determining, by the remote processor using a DSB filter circuit, that the first TLBI instruction satisfies filtering criteria of the DSB filter circuit; and
   responsive to determining that the first TLBI instruction satisfies the filtering criteria:
      foregoing execution of a first DSB operation corresponding to the first DSB instruction by the remote processor; and
      issuing a first early DSB acknowledgement to the issuing processor.

15. The method of clause 14, further comprising:
   receiving, by the remote processor from the issuing processor, a second TLBI instruction indicating a second request to invalidate a second TLB entry of the plurality of TLB entries of the TLB of the remote processor;
   receiving, by the remote processor from the issuing processor, a second DSB instruction;
   determining, by the remote processor, that the second TLBI instruction does not satisfy the filtering criteria; and
   responsive to determining that the second TLBI instruction does not satisfy the filtering criteria:
      executing a second DSB operation corresponding to the second DSB instruction; and
      upon completion of execution of the second DSB operation, issue a second DSB acknowledgement to the issuing processor.

16. The method of any one of clauses 14-15, wherein:
   the DSB filter circuit comprises a TLBI filter; and
   determining that the first TLBI instruction satisfies the filtering criteria comprises determining that the TLBI filter indicates that an identifier associated with the first TLBI instruction is not stored in the TLBI filter.

17. The method of clause 16, wherein:
   the TLBI filter comprises a virtual machine identifier (VMID) filter; and
   determining that the TLBI filter indicates that the identifier associated with the first TLBI instruction is not stored in the TLBI filter comprises determining that the VMID filter indicates that a VMID of the first TLBI instruction is not stored in the VMID filter.

18. The method of any one of clauses 16-17, wherein:
   the TLBI filter comprises an address space identifier (ASID) filter; and
   determining that the TLBI filter indicates that the identifier associated with the first TLBI instruction is not stored in the TLBI filter comprises determining that the ASID filter indicates that an ASID of the first TLBI instruction is not stored in the ASID filter.

19. The method of any one of clauses 16-18, wherein:
   the TLBI filter comprises a virtual address (VA) identifier filter; and
   determining that the TLBI filter indicates that the identifier associated with the first TLBI instruction is not stored in the TLBI filter comprises determining that the VA identifier filter indicates that a VA identifier of the first TLBI instruction is not stored in the VA identifier filter.

20. The method of any one of clauses 16-19, further comprising regenerating the TLBI filter.

21. The method of clause 20, wherein regenerating the TLBI filter comprises removing, from the TLBI filter, an indication that the identifier associated with the first TLBI instruction is stored in the TLBI filter.

22. The method of any one of clauses 16-21, wherein the TLBI filter comprises a Bloom filter.

23. The method of any one of clauses 14-22, wherein:
   the DSB filter circuit comprises:
      an address space identifier (ASID)/virtual machine identifier (VMID) context table; and
      an eviction filter; and
   determining that the first TLBI instruction satisfies the filtering criteria comprises:
      determining that the ASID/VMID context table indicates a miss on an ASID and a VMID associated with the first TLBI instruction; and
      determining that the eviction filter indicates that that a translation identifier of a translation associated with the first TLBI instruction is not stored in the eviction filter.

24. The method of any one of clauses 14-23, wherein:
   the DSB filter circuit comprises:
      a virtual address (VA) region context table; and
      an eviction filter; and
   determining that the first TLBI instruction satisfies the filtering criteria comprises:
      determining that the VA region context table indicates a miss on a VA region associated with the first TLBI instruction; and determining that the eviction filter indicates that that a translation identifier of a translation associated with the first TLBI instruction is not stored in the eviction filter.

25. A non-transitory computer-readable medium, having stored thereon computer-executable instructions that, when executed, cause a processor of a processor-based device to:
receive, from an issuing processor of a plurality of processors, a translation lookaside buffer (TLB) invalidation (TLBI) instruction indicating a request to invalidate a TLB entry of a plurality of TLB entries of a TLB of the processor;
receive, from the issuing processor, a data synchronization barrier (DSB) instruction;
determine whether the TLBI instruction satisfies filtering criteria; and
responsive to determining that the TLBI instruction satisfies the filtering criteria:
forego execution of a DSB operation corresponding to the DSB instruction; and
issue an early DSB acknowledgement to the issuing processor.

26. The non-transitory computer-readable medium of clause 25, wherein the computer-executable instructions further cause the processor to, responsive to determining that the TLBI instruction does not satisfy the filtering criteria:
execute the DSB operation corresponding to the DSB instruction; and
upon completion of execution of the DSB operation, issue a DSB acknowledgement to the issuing processor.

27. The non-transitory computer-readable medium of any one of clauses 25-26, wherein:
a DSB filter circuit comprises a TLBI filter; and
the computer-executable instructions cause the processor to determine whether the TLBI instruction satisfies the filtering criteria by causing the processor to determine whether the TLBI filter indicates that an identifier associated with the TLBI instruction is not stored in the TLBI filter.

28. The non-transitory computer-readable medium of clause 27, wherein:
the TLBI filter comprises a virtual machine identifier (VMID) filter; and
the computer-executable instructions cause the processor to determine whether the TLBI filter indicates that the identifier associated with the TLBI instruction is not stored in the TLBI filter by causing the processor to determine whether the VMID filter indicates that a VMID of the TLBI instruction is not stored in the VMID filter.

29. The non-transitory computer-readable medium of any one of clauses 27-28, wherein:
the TLBI filter comprises an address space identifier (ASID) filter; and
the computer-executable instructions cause the processor to determine whether the TLBI filter indicates that the identifier associated with the TLBI instruction is not stored in the TLBI filter by causing the processor to determine whether the ASID filter indicates that an ASID of the TLBI instruction is not stored in the ASID filter.

30. The non-transitory computer-readable medium of any one of clauses 27-29, wherein:
the TLBI filter comprises a virtual address (VA) identifier filter; and the computer-executable instructions cause the processor to determine whether the TLBI filter indicates that the identifier associated with the TLBI instruction is not stored in the TLBI filter by causing the processor to determine whether the VA identifier filter indicates that a VA identifier of the TLBI instruction is not stored in the VA identifier filter.

31. The non-transitory computer-readable medium of any one of clauses 27-30, wherein the processor is wherein the computer-executable instructions further cause the processor to regenerate the TLBI filter.

32. The non-transitory computer-readable medium of clause 31, wherein the computer-executable instructions cause the processor to regenerate the TLBI filter by causing the processor to remove, from the TLBI filter, an indication that the identifier associated with the TLBI instruction is stored in the TLBI filter.

33. The non-transitory computer-readable medium of any one of clauses 27-32, wherein the TLBI filter comprises a Bloom filter.

34. The non-transitory computer-readable medium of clause any one of clauses 25-33, wherein:
a DSB filter circuit comprises:
an address space identifier (ASID)/virtual machine identifier (VMID) context table; and
an eviction filter; and
the computer-executable instructions cause the processor to determine whether the TLBI instruction satisfies the filtering criteria by causing the processor to:
determine whether the ASID/VMID context table indicates a miss on an ASID and a VMID associated with the TLBI instruction; and
determine that the eviction filter indicates that that a translation identifier of a translation associated with the TLBI instruction is not stored in the eviction filter.

35. The non-transitory computer-readable medium of any one of clauses 25-34, wherein:
a DSB filter circuit comprises:
a virtual address (VA) region context table; and
an eviction filter; and
the computer-executable instructions cause the processor to determine whether the TLBI instruction satisfies the filtering criteria by causing the processor to:
determine whether the VA region context table indicates a miss on a VA region associated with the TLBI instruction; and
determine that the eviction filter indicates that that a translation identifier of a translation associated with the TLBI instruction is not stored in the eviction filter.

What is claimed is:
1. A processor device, configured to:
receive, from an issuing processor device, a translation lookaside buffer (TLB) invalidation (TLBI) instruction indicating a request to invalidate a TLB entry of a plurality of TLB entries of a TLB;
receive, from the issuing processor device, a Data Synchronization Barrier (DSB) instruction;
determine, using a DSB filter circuit corresponding to the TLB, whether the TLBI instruction satisfies filtering criteria; and
responsive to determining that the TLBI instruction satisfies the filtering criteria:
forego execution of a DSB operation corresponding to the DSB instruction by the processor device; and issue an early DSB acknowledgement to the issuing processor device.

2. The processor device of claim 1, wherein the processor device is further configured to, responsive to determining that the TLBI instruction does not satisfy the filtering criteria:
execute the DSB operation corresponding to the DSB instruction; and
upon completion of execution of the DSB operation, issue a DSB acknowledgement to the issuing processor device.

3. The processor device of claim 1, wherein:
the DSB filter circuit comprises a TLBI filter; and
the processor device is configured to determine whether the TLBI instruction satisfies the filtering criteria by being configured to determine whether the TLBI filter indicates that an identifier associated with the TLBI instruction is not stored in the TLBI filter.

4. The processor device of claim 3, wherein:
the TLBI filter comprises a virtual machine identifier (VMID) filter; and
the processor device is configured to determine whether the TLBI filter indicates that the identifier associated with the TLBI instruction is not stored in the TLBI filter by being configured to determine whether the VMID filter indicates that a VMID of the TLBI instruction is not stored in the VMID filter.

5. The processor device of claim 3, wherein:
the TLBI filter comprises an address space identifier (ASID) filter; and
the processor device is configured to determine whether the TLBI filter indicates that the identifier associated with the TLBI instruction is not stored in the TLBI filter by being configured to determine whether the ASID filter indicates that an ASID of the TLBI instruction is not stored in the ASID filter.

6. The processor device of claim 3, wherein:
the TLBI filter comprises a virtual address (VA) identifier filter; and
the processor device is configured to determine whether the TLBI filter indicates that the identifier associated with the TLBI instruction is not stored in the TLBI filter by being configured to determine whether the VA identifier filter indicates that a VA identifier of the TLBI instruction is not stored in the VA identifier filter.

7. The processor device of claim 3, wherein the processor device is further configured to regenerate the TLBI filter.

8. The processor device of claim 7, wherein the processor device is configured to regenerate the TLBI filter by being configured to remove, from the TLBI filter, an indication that the identifier associated with the TLBI instruction is stored in the TLBI filter.

9. The processor device of claim 3, wherein the TLBI filter comprises a Bloom filter.

10. The processor device of claim 1, wherein:
the DSB filter circuit comprises:
an address space identifier (ASID)/virtual machine identifier (VMID) context table; and
an eviction filter; and
the processor device is configured to determine whether the TLBI instruction satisfies the filtering criteria by being configured to:
determine whether the ASID/VMID context table indicates a miss on an ASID and a VMID associated with the TLBI instruction; and
determine whether the eviction filter indicates that a translation identifier of a translation associated with the TLBI instruction is not stored in the eviction filter.

11. The processor device of claim 10, wherein the processor device is further configured to track, using the ASID/VMID context table, a plurality of ASID/VMID combinations that each identifies a processor context and corresponds to a TLB entry of the plurality of TLB entries.

12. The processor device of claim 1, wherein:
the DSB filter circuit comprises:
a virtual address (VA) region context table; and
an eviction filter; and
the processor device is configured to determine whether the TLBI instruction satisfies the filtering criteria by being configured to:
determine whether the VA region context table indicates a miss on a VA region associated with the TLBI instruction; and
determine whether the eviction filter indicates that a translation identifier of a translation associated with the TLBI instruction is not stored in the eviction filter.

13. The processor device of claim 12, wherein the processor device is further configured to track, using the VA region context table, a plurality of VA regions that each identifies a processor context and corresponds to a VA of a TLB entry of the plurality of TLB entries.

14. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

15. A processor device, comprising:
means for receiving, from an issuing processor device, a translation lookaside buffer (TLB) invalidation (TLBI) instruction indicating a request to invalidate a TLB entry of a plurality of TLB entries of a TLB;
means for receiving, from an issuing processor device, a data synchronization barrier (DSB) instruction;
means for determining whether the TLBI instruction satisfies filtering criteria;
means for foregoing execution of a DSB operation corresponding to the DSB instruction, responsive to determining that the TLBI instruction satisfies the filtering criteria; and
means for issuing an early DSB acknowledgement to the issuing processor device, responsive to determining that the TLBI instruction satisfies the filtering criteria.

16. A method for filtering remote Data Synchronization Barrier (DSB) instruction execution, comprising:
determining, by a processor device, that a translation lookaside buffer (TLB) invalidation (TLBI) instruction received from an issuing processor device satisfies filtering criteria, wherein the TLBI instruction indicates a request to invalidate a TLB entry of a plurality of TLB entries of a TLB of the processor device; and responsive to determining that the TLBI instruction satisfies the filtering criteria:

foregoing execution of a DSB operation corresponding to a DSB instruction received from the issuing processor device; and issuing an early DSB acknowledgement to the issuing processor device.

17. The method of claim 16, wherein determining that the TLBI instruction satisfies the filtering criteria comprises determining that a TLBI filter indicates that an identifier associated with the TLBI instruction is not stored in the TLBI filter.

18. The method of claim 17, wherein determining that the TLBI filter indicates that the identifier associated with the TLBI instruction is not stored in the TLBI filter comprises determining that a virtual machine identifier (VMID) filter indicates that a VMID of the TLBI instruction is not stored in the VMID filter.

19. The method of claim 17, wherein determining that the TLBI filter indicates that the identifier associated with the TLBI instruction is not stored in the TLBI filter comprises determining that an address space identifier (ASID) filter indicates that an ASID of the TLBI instruction is not stored in the ASID filter.

20. The method of claim 17, wherein determining that the TLBI filter indicates that the identifier associated with the TLBI instruction is not stored in the TLBI filter comprises determining that a virtual address (VA) identifier filter indicates that a VA identifier of the TLBI instruction is not stored in the VA identifier filter.

* * * * *